Sept. 18, 1928.　　　　　W. O. HALL ET AL　　　　　1,684,731

PRINTING PRESS

Filed Nov. 7, 1924　　　　10 Sheets-Sheet 1

Sept. 18, 1928.　　　　W. O. HALL ET AL　　　　1,684,731

PRINTING PRESS

Filed Nov. 7, 1924　　　10 Sheets-Sheet 5

Inventor
W. O. Hall and
W. C. Buchanan,
By Watson, Coit, Morse & Grindle
Attorney

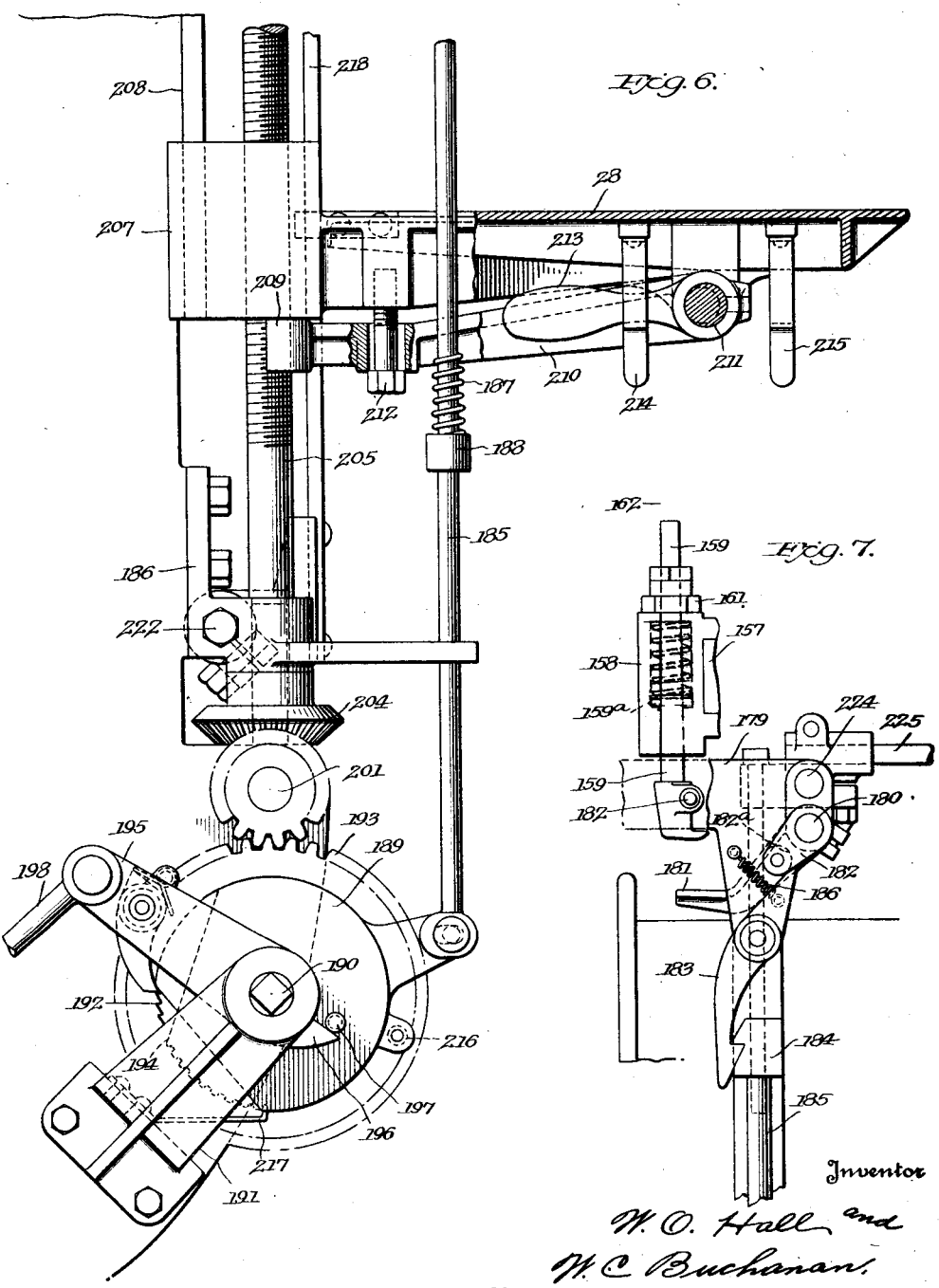

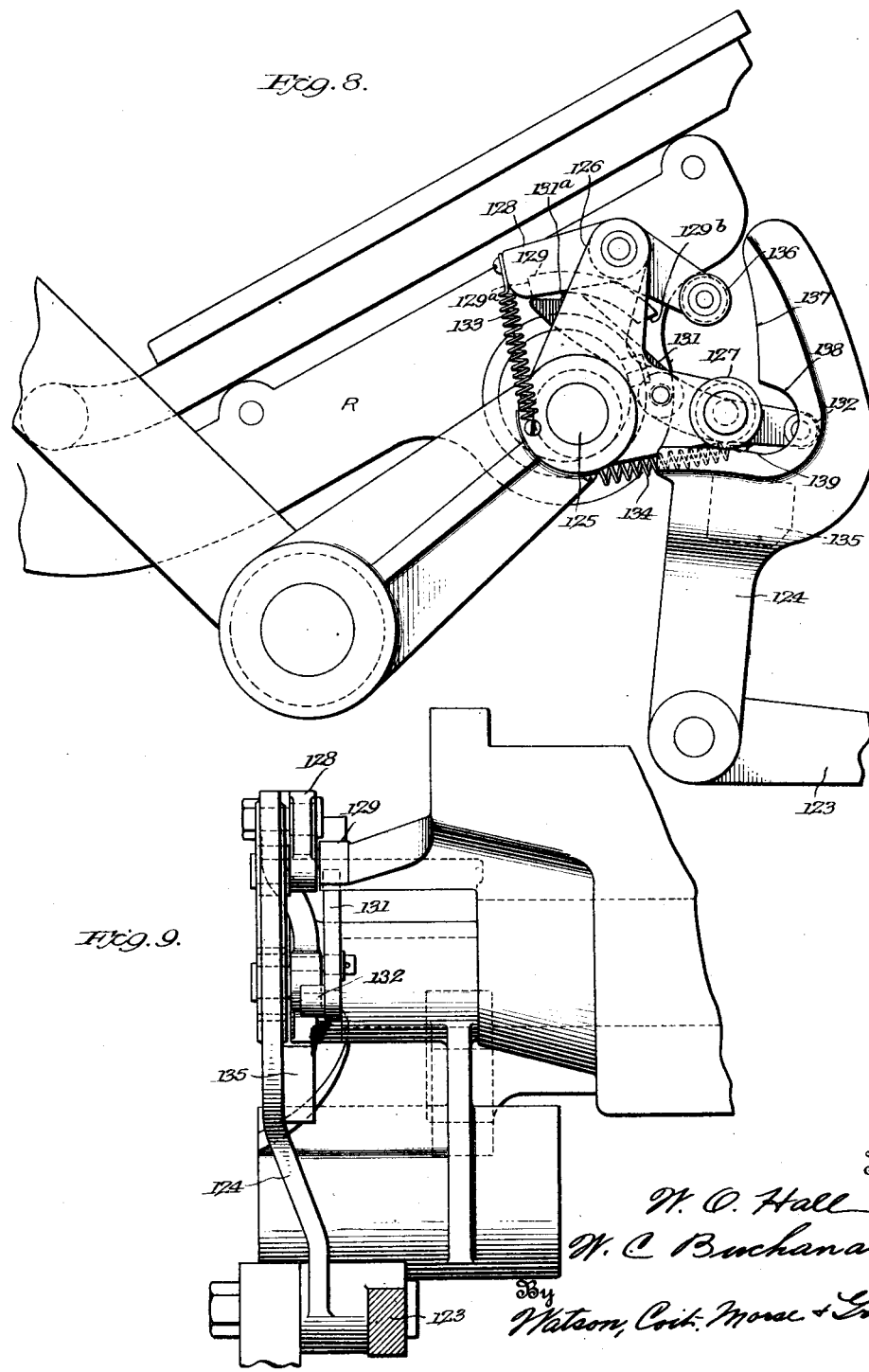

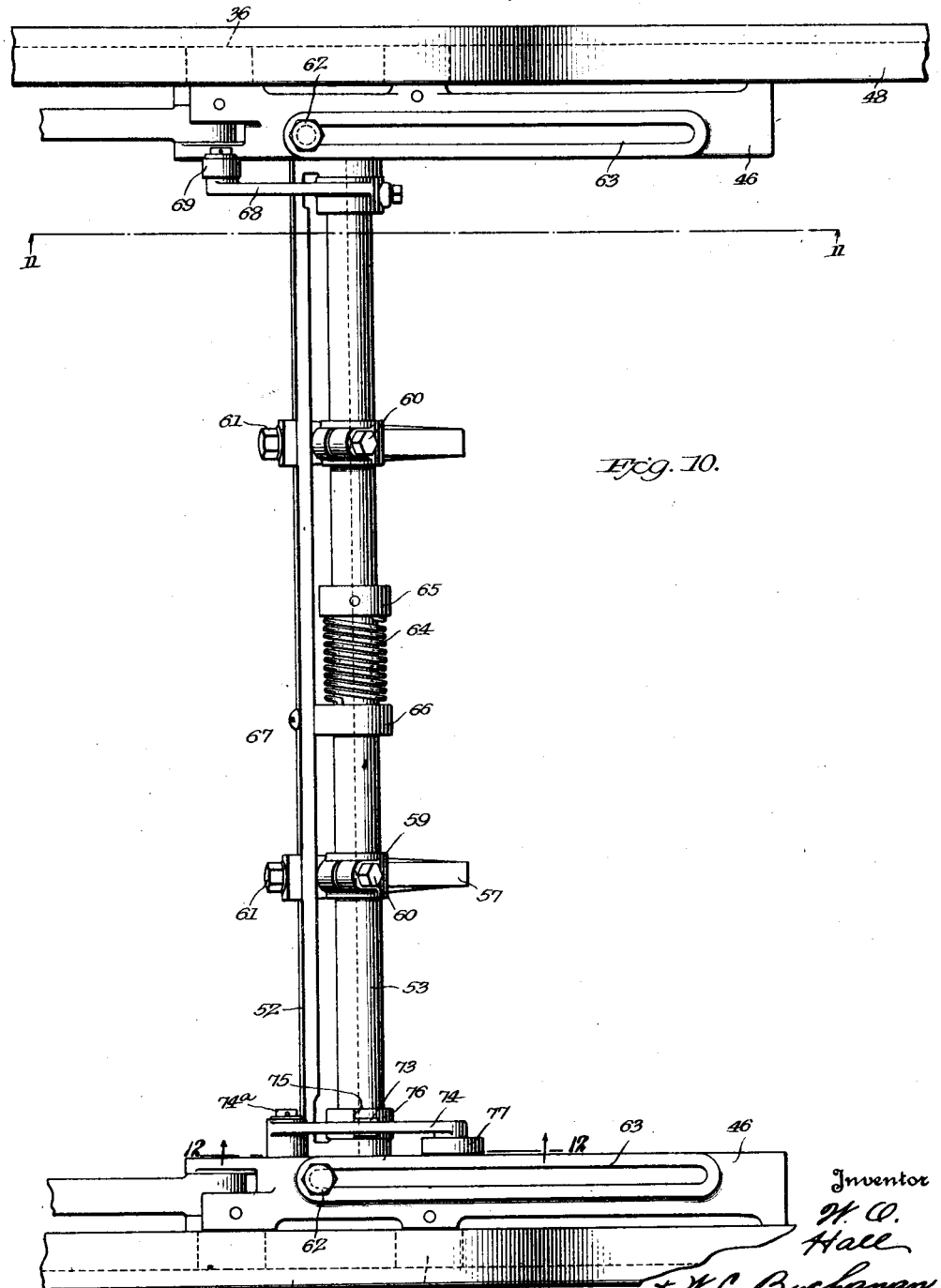

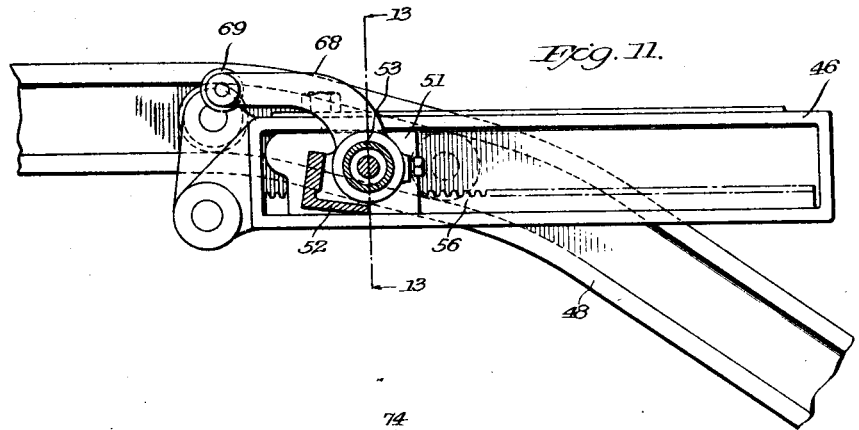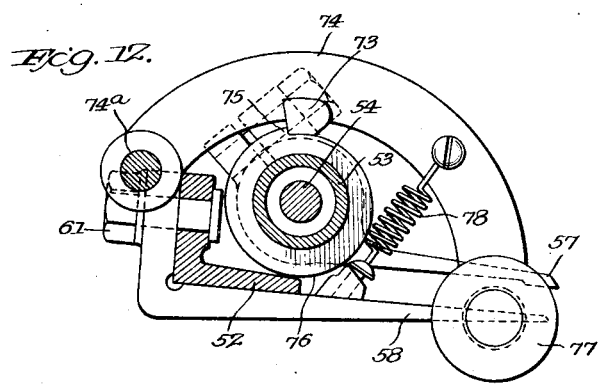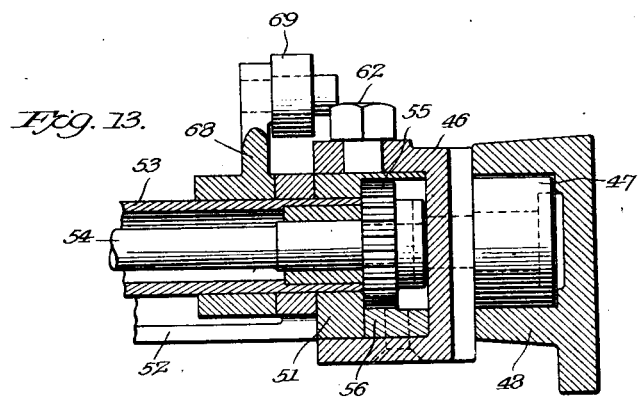

Sept. 18, 1928.  
W. O. HALL ET AL  
PRINTING PRESS  
Filed Nov. 7, 1924    10 Sheets-Sheet 10  
1,684,731
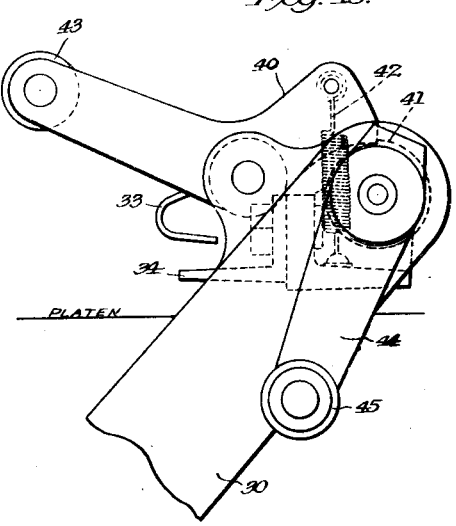
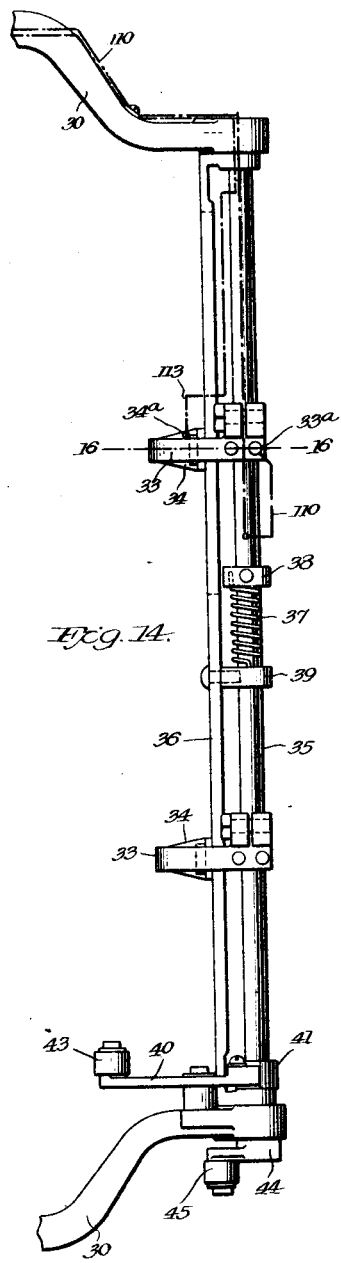
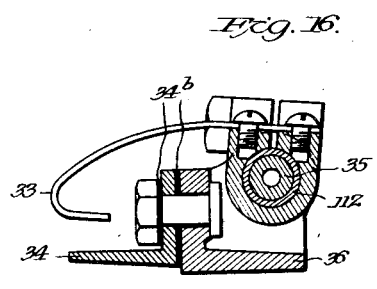
Inventor  
W. O. Hall and  
W. C. Buchanan,  
By Watson, Coit, Morse  
+ Grindle  
Attorney Patented Sept. 18, 1928.

1,684,731

UNITED STATES PATENT OFFICE.

WALTER O. HALL AND WILLIAM C. BUCHANAN, OF FRANKLIN, MASSACHUSETTS.

PRINTING PRESS.

Application filed November 7, 1924. Serial No. 748,486.

The present invention relates to printing presses and more particularly to such presses having an oscillating platen.

The principal features of the invention consist in the provision of a press of this type with:

1. Means to throw the platen to impression-off position if a sheet is not fed to the press.
2. Means to render the sheet delivery means inoperative if the press fails to feed a sheet.
3. Means for rendering the sheet delivery inoperative actuated simultaneously with the means for throwing the platen to impression-off position.
4. Means for automatically elevating the pile supporting table to maintain the top of the pile of sheets substantially at a constant elevation.
5. Means for lifting sheets singly from the top of the pile of sheets and delivering them to the transfer mechanism that feeds the sheets to the platen.
6. Means for adjusting the elevating mechanism of the pile supporting table to vary the extent of each raising step in accordance with the thickness of the sheets.
7. Means for automatically lowering the delivery table step by step.
8. Means for adjusting the extent of movement of the steps metioned in the preceding paragraph.
9. Means to permit an accurate adjustment of the delivery grippers through a side range by very simple manipulations.
10. Improved means for permitting rapid raising or lowering of the feed and delivery tables.

Other features of novelty will be apparent from the description taken in connection with the drawings in which:

Figs. 6 and 7 are views illustrating details of the feed table elevating mechanism.

Figs. 8 and 9 are side and rear views, respectively, of impression throw off mechanism.

Fig. 10 is a fragmentary plan view looking down on the delivery grippers.

Fig. 11 is a sectional view taken on the line 11—11 of Fig. 10.

Fig. 12 is a section on the line 12—12 of Fig. 10.

Fig. 13 is a section on the line 13—13 of Fig. 11.

Fig. 14 is a top plan view of the delivery grippers and associated controlling devices.

Fig. 15 is a view of the right hand side of Fig. 14.

Fig. 16 is a section on the line 16—16 of Fig. 14.

Figure 1:
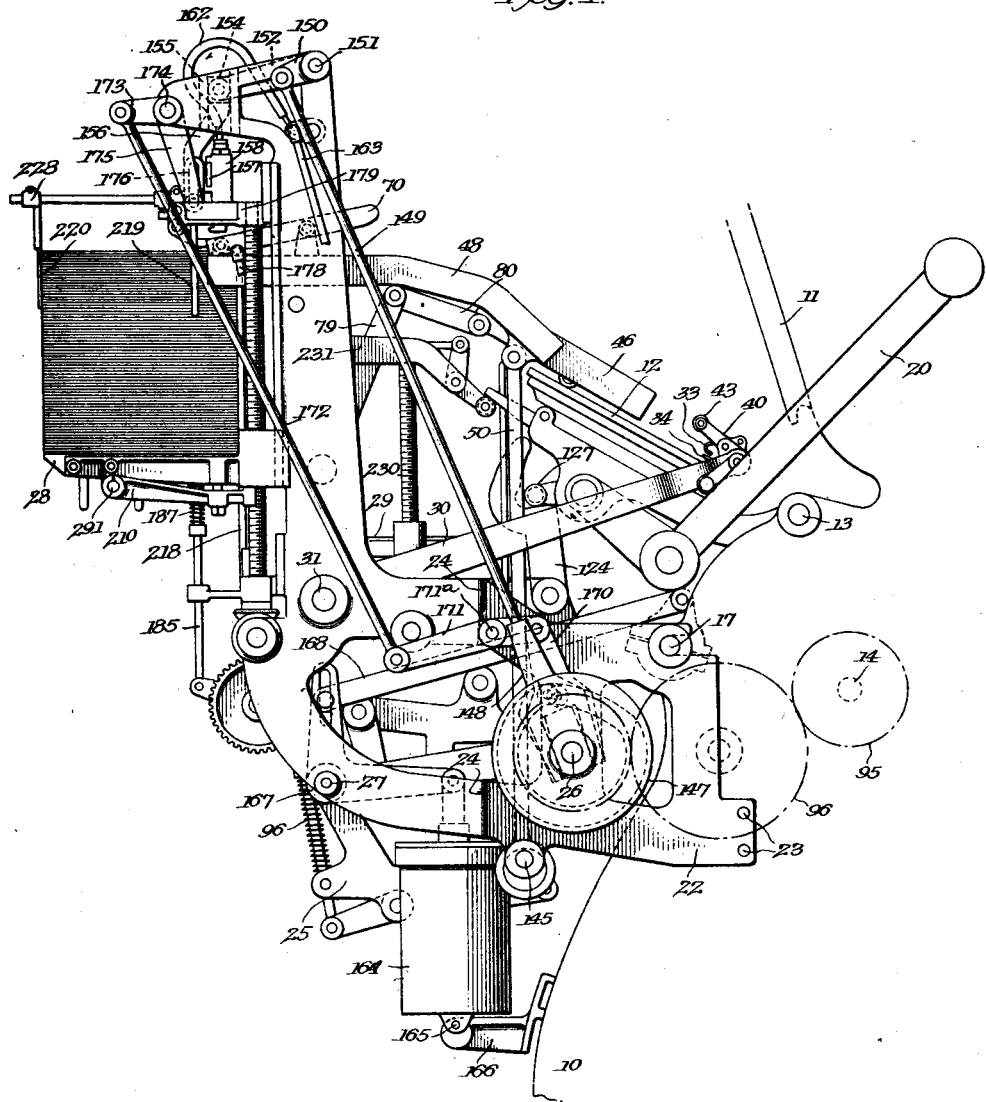
Figs. 1 and 2 are elevations respectively of the right and left hand sides of the machine.

Referring particularly to Figs. 1 to 4, a fragment of the press frame is shown at 10, the bed at 11 and the platen at 12. The platen is mounted to rock on pivots 13 and is oscillated by well known connections, including a crank shaft 14, a rocker 16 pivoted at 17, a link 15 connecting the crank and rocker, toggle links 18 and 19 and a pair of draw bars 20, connecting the toggle links with the frame 10 and extending across the ends of the platen.

The sheet handling mechanism is mounted on a feeder frame attached at the front of the press frame 10. This feeder frame may comprise two side frames 21 and 22 consisting of castings of a general L-shaped design and of cut-away and channeled construction, to give the required strength with minimum weight of material. The side frames are bolted at their lower right hand ends as viewed in Fig. 1 to the sides of the press frame, as at 23, and are supported at their upper right hand ends as viewed in Fig. 1 on the rocker shaft 17. They extend in parallel planes from the press frame 10 to points 24, where they are offset outwardly a short distance and thence extend in parallel planes upwardly and to the left as viewed in Fig. 1, the upper portions of said castings thus being offset and providing a wider space between them than that included between the sides of the frame of the press. The feeder frame also includes a center bearing frame 25 which is located between the lower portions of the side frames 21, 22. Frame 25 has a triangular form with an apex thereof located and supported on a shaft 26, the rear of the frame being supported on a tie rod 27 bolted to the side frames 21, 22.

*Sheet transfer mechanism.*

The sheets are fed to the platen from a pile supported on a table 28 and after receiving the impression are taken from the platen and deposited on a table 29 located between table 28 and the press. The mechanism for transferring the sheets to the platen comprises two or more pairs of gripper fingers supported from the outer ends of a pair of arms 30 which are keyed on a shaft 31 pivoted in the side frames 21 and 22. Arms 30 are oscillated from the crank shaft 14 of the press by means of a link 32 (Fig. 2) which is pivoted at one end to one of the arms 30 and at its other end to a crank 32ª on the end of shaft 14. Since crank shaft 14 makes one revolution for each printing cycle, the feeding fingers will make one complete oscillation, from the sheet pile to the platen and back to the sheet pile, per cycle.

Figure 2:
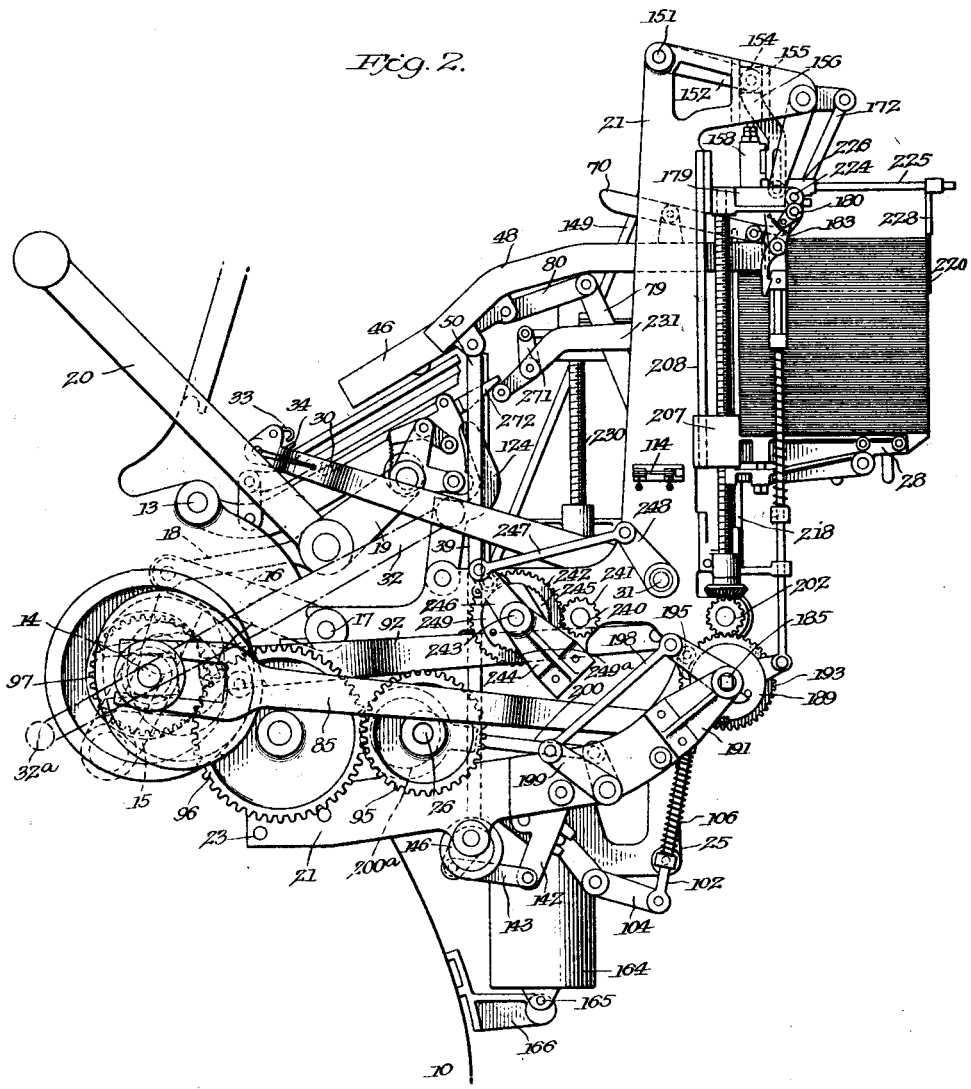
Figure 3:
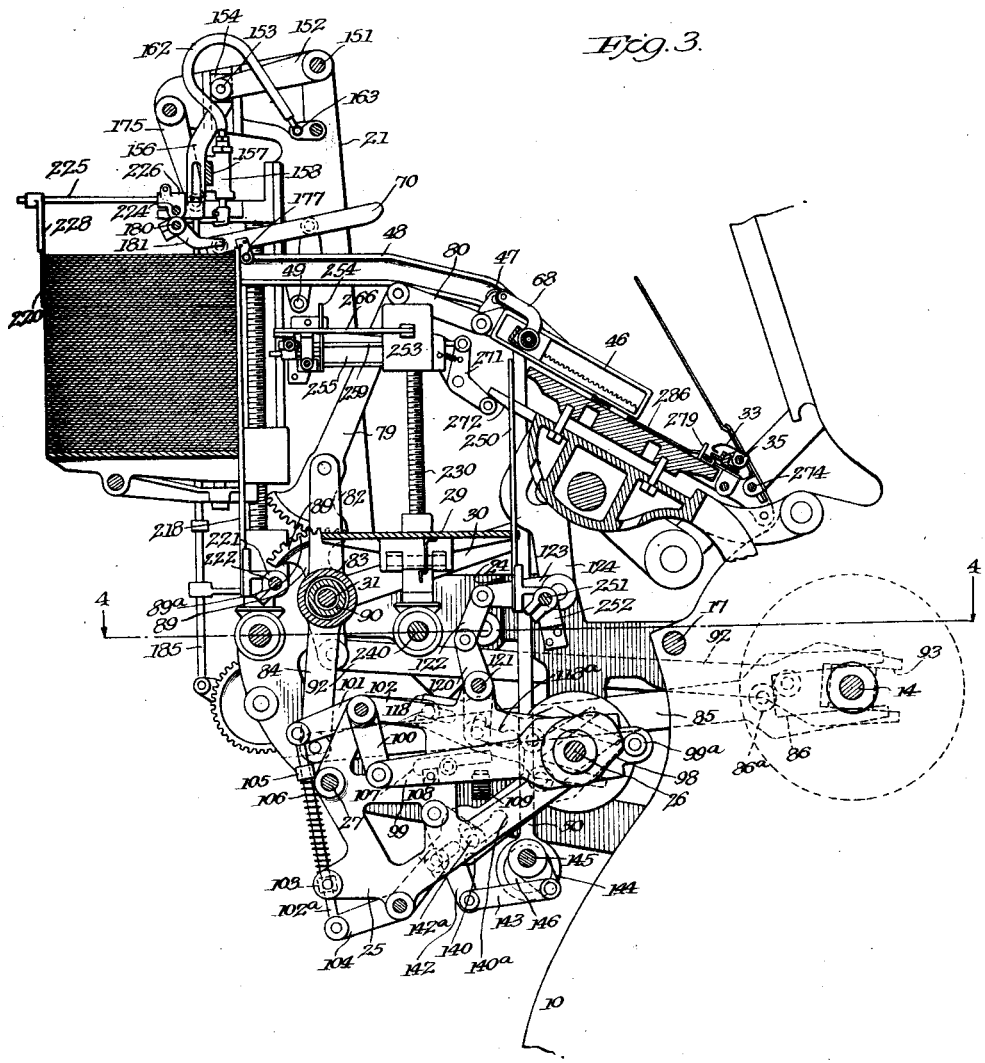
Fig. 3 is a longitudinal vertical section taken on the line 3—3 of Fig. 4.

Each pair of feed gripper fingers, as more clearly shown in Figs. 14, 15 and 16, consists of an upper movable finger 33 and a lower relatively stationary finger 34. The upper fingers are adjustably secured on a hollow shaft 35 which extends between the arms 30 and is pivoted at the ends of said arms. The lower relatively stationary fingers 34 are adjustably attached to the vertical flange of an angle bar 36 which is secured at its ends to arms 30 and acts as a tie rod. The upper fingers are biased to closed position by a spring 37 which is secured at one end to a collar 38 fast on shaft 35 and at its other end to a collar 39 loosely surrounding shaft 35 and secured to angle bar 36. The upper fingers are held open or cocked, as shown in Fig. 15, by means of a dog 40 engaging a one-tooth ratchet 41 secured on shaft 35. Dog 40 is held in engagement with the ratchet by a spring 42 at one end and carries on its opposite end a roller 43. Secured to an end of shaft 35 on the outside of arm 30 is an arm 44 carrying a roller 45 at its free end, adapted to engage the draw bar 20 and open the fingers. In Figs. 1, 2 and 3 the arms 30 carrying the feed grippers have been swung down to the limit of their movement and the grippers have been opened by the roller 45 coming into engagement with draw bar 20 and are held open or cocked by dog 40 snapping into the ratchet 41. The sheet which was carried by the grippers was deposited on the platen, a short time previously, the parts being so constructed that the sheet will be released by opening the fingers before they reach the limit of their downward movement, so that on their return movement they will not contact the head end of the sheet. On the return movement the fingers are held cocked by the engagement of dog 40 with ratchet 41 until they approach the limit of this movement, whereupon roller 43 on the dog comes into contact with a cam (not shown) secured on the inside of the adjacent casting 22 near the top thereof, thus releasing the gripper shaft and permitting spring 37 to close the fingers. Normally as the fingers close they grip between them a sheet which had been taken from the pile on feed table 28 and inserted into their throats by mechanism hereinafter described.

*Sheet delivery mechanism.*

As in the case of the feed grippers, the delivery grippers consist of two or more pairs of fingers which are adapted to be oscillated bodily to and from the platen and to be automatically cocked and uncocked in proper timed relation to the operation of the press. Referring more particularly to Figs. 10 to 13, the delivery grippers are carried by transverse supports which are mounted at their ends in a pair of housings 46. Mounted on the outer side of each housing is a pair of rollers 47 tracking in cam guides 48 which are pivoted upon studs 49 on the inner faces of the side frames (see Figs. 3 and 5) and are supported near their forward ends by rods 50 (Figs. 1 and 2). Slidably mounted in each of the housings is a block 51 and tying these blocks together is an angle bar 52. A hollow shaft 53 is journaled at its ends in the blocks 51 and in this shaft is a small shaft 54 which projects through the blocks and carries on its projecting ends toothed wheels 55 which mesh with racks 56 secured in the housings. Each pair of delivery fingers consist of an upper rotatable finger 57 and a lower relatively stationary finger 58. The upper fingers are formed with split collars 59 which are adapted to be clamped in adjusted positions on shaft 53 by bolts 60. The lower fingers are suitably supported for adjustment on the angle bar 52 as by means of clamping bolts 61 passing through upstanding tail portions of the fingers and through longitudinal slots in the angle bar. The blocks 51 are adapted to be held in adjusted positions in the housing by means of clamping bolts 62 secured to the blocks and projecting through longitudinal slots 63 in the upper wall of the housings. When it is desired to adjust the position of the fingers relatively to the platen, as when sheets of different lengths are fed, it is only necessary to slack bolts 62, move the finger supports by hand to the correct position, and then tighten the bolts. In this adjusting movement, the meshing of wheels 55 with racks 56 causes rotation of the small shaft 54 and compels exactly equal movements of the blocks in both housings thereby effecting a very accurate parallel movement of the finger supports mounted on said blocks. This provides a very easy and accurate adjustment of the delivery fingers through a wide range adapting the grippers for operation on sheets of widely different lengths without the necessity of varying the position of the head ends of the sheets on the platen.

A spring 64 surrounding shaft 53 has one end fixed to a collar 65 secured to said shaft and has its other end fixed to a collar 66 in which the shaft is rotatable and which is secured to angle bar 52 by screws 67. Spring 64 exerts a torque on shaft 53 in a clockwise direction, looking at Fig. 12, that is, in a direction to move fingers 57 into engagement with fingers 58. The upper fingers are moved in a contrary direction, or cocked, when they approach the limit of their movement away from the platen by means of an arm 68 adjustably secured on shaft 53 just inside the left hand housing 46, a roller 69 on the free end of said arm and a cam 70 (Fig. 3) supported on cam guide 48. Cam 70 consists of an inclined bar having its rear end pivoted on a lug upstanding from a cam guide 48 and supported intermediate its ends by another lug of greater height. When the grippers approach correct sheet depositing position roller 69 runs under cam bar 70 and is thereby depressed, causing rotation of shaft 53 in a counterclockwise direction, looking at Fig. 12 and cocking the fingers. The fingers are held open or cocked by a dog 73 on an arm 74 engaging a shoulder 75 formed on a collar 76 secured to shaft 53. Arm 74 is pivoted at its rear end on a pin 74ª projecting from block 40 just inside the right hand housing and at the opposite side of the machine from the cocking arm 68. As clearly shown in Fig. 12, arm 74 extends from its pivot in the form of an arc over shaft 53 and terminates substantially below this shaft, carrying on its free end a roller 77. A spring 78, tends to hold arm 74 down. Roller 77 is so positioned that when the cocked fingers approach the limit of their movement toward the platen and the tail end of the sheet thereon has entered between the fingers, the roller comes into contact with the platen, or an abutment rigid therewith, and thus causes arm 74 to move upward against the tension of spring 78, releasing shaft 53 and causing the grippers to close.

Referring to Figs. 1 to 4, the operating mechanism for the delivery grippers, that is, the mechanism for moving these grippers bodily towards and from the platen, comprises a pair of levers 79 pivoted at their upper ends to links 80, which are pivoted at their forward ends to the housings 46. The levers have a resultant motion produced by two trains of mechanism actuated from the crank shaft 14 of the press and so designed as to produce quick movements of the grippers over or across the platen and a quick get-away from the platen, with a substantial dwell following the movement from the platen. Accordingly levers 79 are fulcrumed to the upper ends of arms 82 which are formed with or rigidly connected to a sleeve 83. Sleeve 83 has rigidly formed therewith at its left hand end a depending arm 84 which is pivoted to one end of a link 85, the other end of the latter being formed with a fork 86 which works on a square block journaled on shaft 14. This fork carries a laterally projecting roller 86ª which works in a cam track 87ᵇ formed in the face of a disk 87 (Fig. 4) keyed on shaft 14. The lower ends of levers 79 are formed as gear segments and meshing therewith are similar segments 89ª formed on the upper ends of arms 89 which are secured to the ends of a sleeve 90 rotatable on shaft 31 located in the sleeve 83. The left hand arm 89 is formed with a depending arm 91 which is pivoted to a link 92, the forward end of which is provided with a yoke 93 working on a square block on shaft 14 and having a roller 93ª working in a cam slot 93ᵇ formed in the face of a disk 94 keyed on shaft 14. The levers 79 accordingly have a resultant motion derived from the rotation of the gear segments on arms 89 and from their bodily oscillation over the segments by the rotation of arms 82. The cams are so formed as to produce quick movements of the grippers across the platen and a quick get-away from the platen, to avoid interference with the platen and to abstract the printed sheet and move it away from the platen while the feeding grippers are conveying a sheet to the platen, and so as to produce a substantial dwell of the delivery grippers following the end of their movement away from the platen, to allow time for the platen to make its printing stroke before the grippers again move forward to take the printed sheet.

*Impression throw off.*

When the feeding grippers fail to feed a sheet to the platen either because the sheet forwarding mechanism has failed to function properly or because the supply of sheets has become exhausted, it is desirable to prevent offset on the packing or make ready and also to put the delivery grippers in an inoperative condition. The mechanism for performing these functions will next be described.

Figure 4:
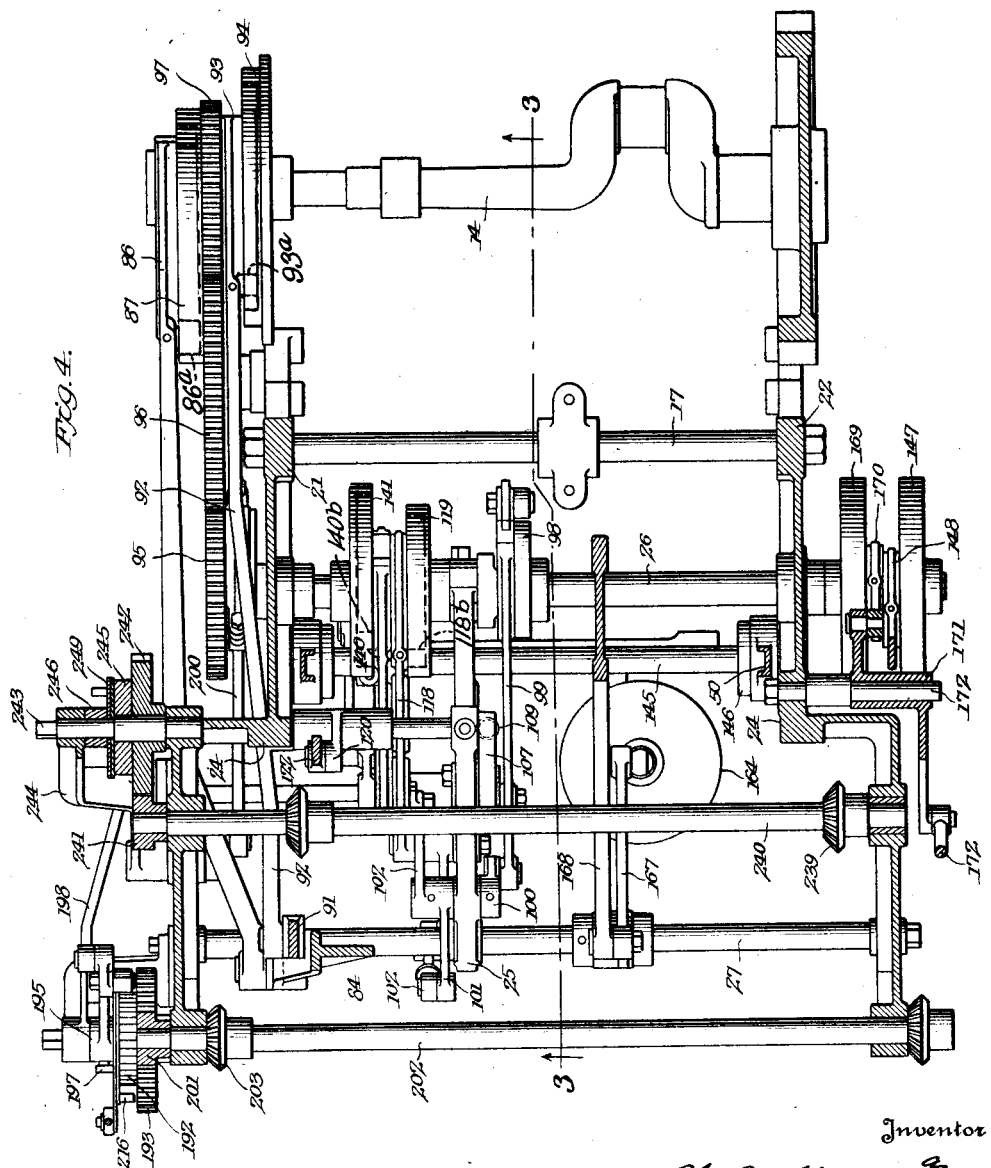
Fig. 4 is a horizontal section taken on the line 4—4 of Fig. 3.

The shaft 26 previously referred to carries at one end thereof a spur gear 95 located on the outside of the feeder side frame 21. Meshing with gear 95 is a larger gear 96 journaled on a stud secured to side frame 21 and meshing with a gear 97 bolted to the cam disk 87 on the projecting end of crank shaft 14. The gears 95 and 97 are the same size, and since the crank shaft 14 makes one revolution for each printing cycle, it follows that the shaft 26 will also make one revolution per cycle. Referring particularly to Figs. 3 and 4, shaft 26 has keyed thereon a cam 98 of the peripheral type which is adapted to operate a pitman 99 in one direction. Pitman 99 is formed at its forward end as a yoke working on a square block journaled on shaft 26 and having a laterally projecting roller $99^a$ which is adapted to roll on the peripheral cam surface 98. The rear end of the pitman is pivoted to one arm 100 of a three arm rocker, which is mounted in the center bearing frame 25, the other two arms 101 and 102 being located on the opposite side of the center bearing frame from arm 100. Arm 101 is pivoted to the upper end of a rod $102^a$ which is slidable in a block 103 swivelled on the center bearing frame, the lower end of rod $102^a$ being pivoted to one arm of a lever 104 which is fulcrumed on the center bearing frame. Secured to rod $102^a$ is a collar 105 and surrounding the rod between collar 105 and block 103 is a coil spring 106 which is normally under compression and so exerts a force tending to move rod $102^a$ upwardly and pitman 99 to the left, as viewed in Fig. 3. During normal operation however pitman 99 is prevented from moving to the left by means of a latch 107 pivoted to the center bearing frame engaging a square stud 108 on the side of the pitman. Supported on the center bearing frame beneath the tail end of latch 107 is an electromagnet 109 the circuit of which is controlled by the sheet feeding grippers. As indicated in Figs. 2 and 14, one of the terminals of magnet 109 is connected to an insulated conductor 110 leading to the left hand arm 30 and then along the inside of that arm to a point adjacent the outer end thereof where it passes through an aperture to the outer side of the arm and thence into the hollow shaft 35 on which the upper or movable fingers are mounted and thence axially along that shaft to a point adjacent one of the pair of gripper fingers, whence it is led out through an aperture in the hollow shaft and connected to a binding screw $33^a$ on the split collar which carries the upper finger, the said collar being insulated from the shaft by means of an insulating bushing 112. The source of energy is connected to the other pole of the magnet and to an insulated conductor 113 which is connected to a switch 114 secured to the side frame 21, the conductor thence passing along the inner side of arm 30 through the aperture near the outer end thereof and thence through shaft 35 and through an aperture therein and along the tie bar 36 to a binding screw $34^a$, on the lower gripper finger, which is suitably insulated, as indicated in Fig. 16 at $34^b$. The circuit of magnet 109, therefore, includes the gap between a pair of gripping fingers but is otherwise normally closed. Hence under normal operating conditions when the feed grippers are uncocked, as they come into sheet-receiving position, a sheet will be inserted therebetween preventing electrical connection between them, but under abnormal conditions, a sheet will not be inserted between the grippers when they are uncocked or will not be properly inserted, and accordingly the gap which they normally form in the circuit of magnet 109 will be closed and the magnet will be energized to release the latch 107 from engagement with the stud 108, thereby releasing pitman 99, and permitting spring 106 to move rod $102^a$ upwardly.

The upward movement of rod $102^a$ which occurs under the conditions just described, rotates the three-arm rocker in a clockwise direction, looking at Fig. 3, moving the end of arm 102 downwardly. The end of this arm carries a pin $102^b$ which works in a slot in the end of a pitman 118 which is constantly reciprocated during the operation of the press by a cam 119 (Fig. 4) on shaft 26. Cam 119 is of the open face type comprising a disk having a lateral cam groove in which works a roller $118^b$ carried on the end of pitman 118. A platen-throwoff lever 120, fulcrumed on a rod 121 secured to the center bearing frame 25 and to side frame 21, carries on its lower arm a pin $120^a$ which enters a longitudinal slot $118^a$ formed in pitman 118 said slot terminating at its rear end in a right-angularly extending recess in which said pin is adapted to engage when pitman 118 is moved downwardly. Under normal operating conditions, with the parts having the relative positions shown in Fig. 3, the lever 120 is not actuated, but when arm 102 moves downwardly the pin and slot connection thereof with pitman 118 throws the latter down, thus engaging the pin on lever 120 with the right angularly extending recess, thereby causing lever 120 to be rotated in a clockwise direction, looking at Fig. 3, when pitman 118 moves to the left. The upper end of lever 120 is connected by a link 122 with an arm 123 pivoted on a stud secured to side frame 21. Arm 123 is rigid with an upwardly extending arm 124 which controls the platen-throw-off devices. When therefore lever 120 is rotated in a clockwise direction, the toggle constituted by said lever and link 122 is straightened, throwing arm 124 to the right from its normal position, as shown in Fig. 3, and causing movement of the platen to impression-off position by mechanism which will be described presently.

Referring more particularly to Figs. 8 and 9, rigid with the end of the platen-throw-off eccentric shaft 125 is a two-arm lever 126, on one arm of which is journaled a roller 127 and on the other arm is pivoted a latch 128. Normally, latch 128 engages the forward edge 129$^a$ of a sector 129 which is rigid with the rocker R of the press and concentric with the eccentric shaft. When the lever is locked in this position the eccentric shaft is in impression-on position. Pivoted on a pin secured to lever 126 is a second latch lever 131 on the tail end of which is journaled a roller 132. Latch 131 has a shoulder 131$^a$ adapted to engage the rear edge 129$^b$ of sector 129 when lever 126 has been rotated in a clockwise direction to its platen-throw-off position, thus positively locking the platen in this position. Latches 128 and 131 are biased by springs 133 and 134, respectively, to engage sector 129. Roller 132 on the tail end of latch 131 is adapted to engage an abutment 135 projecting inwardly from arm 124.

The operation of the throw off devices just described is as follows: Fig. 8 shows the relative position of the parts when the platen is fully open and the eccentric shaft 125 is locked by latch 128 in impression-on position. When now the arm 124 is rocked to the left by the connections described, upon failure of the grippers to convey a sheet to the platen, the roller 136 on the tail end of latch 128 will engage the face 137 of arm 124 and consequently latch 128 will be rotated from engagement with the left hand end of sector 129. Roller 127 will enter a recess 138 in arm 124, causing lever 126 to be rotated clockwise when the platen moves towards closing position. During the initial part of this movement roller 136 continues to engage the surface 137 and so holds the latch 128 out of engagement with the sector until lever 126 has been rotated sufficiently to engage the tooth of latch 128 with the upper surface of the sector. When lever 126 has been rotated to the limit of its clockwise movement latch 131 engages the right hand end of sector 129, looking at Fig. 8, thus locking lever 126 and the eccentric shaft rigid therewith in impression off position. It is to be noted that the toggle 120, 122, (Fig. 3) is straight when arm 124 is in operative position with respect to the throw off devices, whereby arm 124 is rigidly held against the camming action thereon of these devices. Upon movement of pitman 118 to the right, looking at Fig. 3, in the continued operation of the press, lever 120 will be moved counter-clockwise, looking at Fig. 3, breaking the toggle 120, 122 and causing arm 124 to move back to its normal position, the position shown in Fig. 8. Now when the platen again approaches its open position, roller 132 on latch 131 will first come into engagement with abutment 135 on arm 124, depressing the latch from engagement with the right hand end of sector 129 thereby releasing lever 126. In the continued movement of the platen, roller 127 will engage a surface 139 on arm 124 and arm 126 will consequently be rotated to impression on position, in which position it will be locked by latch 128 snapping over the left hand end of sector 129.

The cams for operating the pitman 99 and 118 are so formed and their operations are so timed with respect to the operation of the platen and feed grippers that the roller on pitman 99 will ride off the high part of cam 98 just before the cocking of the feed grippers as they approach the limit of their movement towards the platen. If at this time the magnet 109 is energized, because of the failure of the grippers to feed a sheet, pitman 99 will be moved to the left, looking at Fig. 3, by the action of spring 106, operating lever arm 102 to throw the pitman 118 down and engage its right angular recess with the pin on lever 120. Then before the platen begins its closing movement pitman 118 will move to the left straightening the toggle 120, 122 and thereby throwing the arm 124 to the left, looking at Fig. 8. As previously described, the movement of arm 124 to the left will cause the platen to be moved to and locked in its impression off position. The cocking of the grippers opens the circuit of magnet 109 and hence latch 107 will engage block 108 when the roller on pitman 99 rides on to the high part of cam 98, which it does when the grippers are near their sheet receiving position. If now the grippers receive between them a sheet, magnet 109 will remain de-energized and pitman 99 will remain locked by the engagement of latch 107 with block 108, but if a sheet is not received magnet 109 will be energized and cause the impression to be thrown off as described. The high part of cam 98 is designed to engage the roller on pitman 99 and move said pitman sufficiently to the right, looking at Fig. 3, to slightly disengage block 108 from latch 107, so that the operation of the latch by the magnet will not be opposed by friction between the latch and block.

*Delivery rendered inoperative.*

The upward movement of rod 102$^a$ consequent upon the release of pitman 99 also rotates lever 104 in a clockwise direction, looking at Fig. 3. This lever is provided with a laterally projecting pin 104$^a$ engaging a slot in the end of a pitman 140 which, like pitman 99, is constantly reciprocated during the operation of the press by a cam on shaft 26. This cam is of the open-face type, consisting of a cam slot in the face of a disk 141, in which slot operates a laterally projecting roller 140$^b$ on the forward end of pitman 140. Pitman 140 is provided with a longitudinal slot 140ᵃ terminating at its rear end in a right-angularly extending recess. Working idly in said longitudinal slot during normal operating conditions is a laterally projecting pin 142ᵃ on a lever 142 which is secured to a shaft journaled in the center bearing plate and in the side frame. The lower end of lever 142 is connected by a link 143 with an arm 144 rigid with a shaft 145. Shaft 145 is journaled in the side frames, 21, 22, and adjacent its ends inside the side frames carries eccentrics 146 which are surrounded by straps secured to the lower ends of rods 50 which support the forward ends of cam guides 48. Cam guides 48, as previously described, are pivoted adjacent their rear ends to the side frames and supported at their forward ends solely by the eccentric rods 50. Attention is here called to the fact that the eccentrics are normally on dead center with respect to the rods 50 so that the weight of these rods and the weight of the cam guides and the sheet delivery mechanism carried thereby has no tendency to rotate the eccentrics. The clockwise rotation of lever 104 by the upward movement of rod 102 throws pitman 140 downwardly from its normal position shown in Fig. 3, and thereby causes the pin on lever 142 to enter the right angular recess communicating with the longitudinal slot of the pitman. Then when the pitman moves rearwardly lever 142 and link 143 will rotate the eccentric shaft and throw the cam guides 48 upwardly so that the delivery grippers will not coact with the platen.

*Feed of sheets from the top of the pile.*

Figure 5:
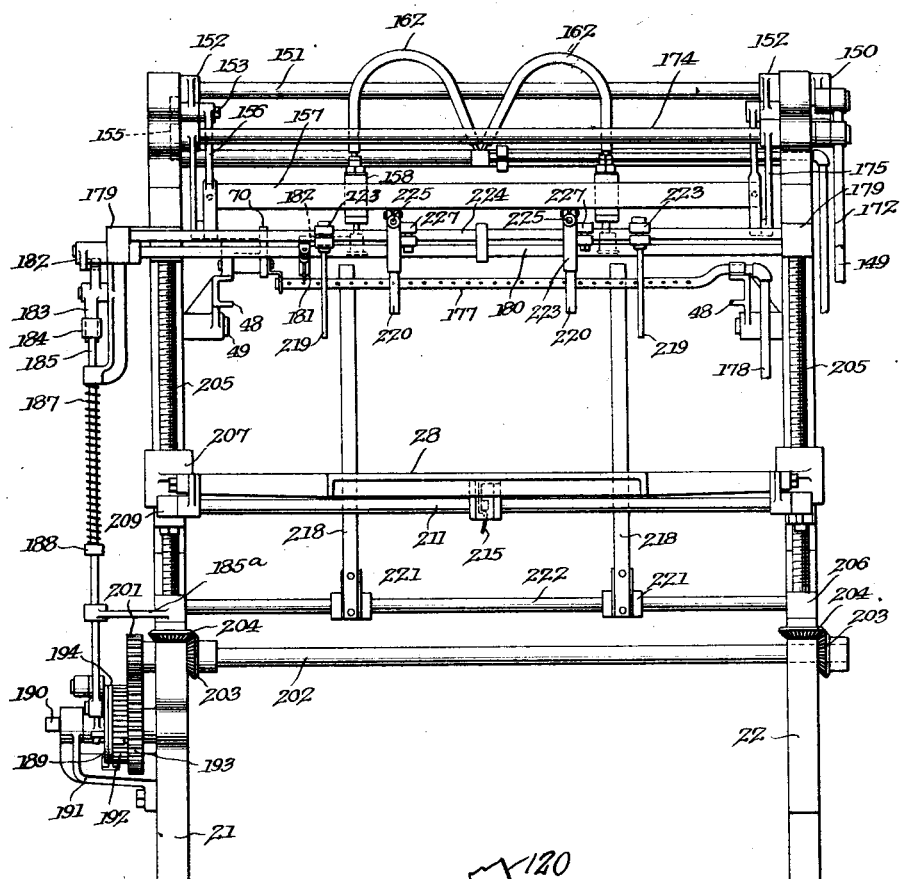
Fig. 5 is a rear elevation illustrating particularly the feed table and asscociated sheet feeding and table controlling mechanism, certain parts of the machine being omitted to show this mechanism more clearly.

The sheets are automatically lifted from the pile on feed table 28 and presented to the feed grippers by mechanism which will now be described. Referring to Figs. 1 to 7, fastened on the shaft 26 outside of the right hand side frame 22 is a cam 147 (Figs. 1 to 4) having a lateral cam groove in which operates a roller journaled on a pin projecting from the side of a yoke 148 which embraces and works on a square block journaled on shaft 26. The yoke is attached to the lower end of a rod 149 which extends upwardly and rearwardly on the outside of the feeder side frame 22 and is connected at its upper end to an arm 150 fast on a shaft 151. Referring particularly to Fig. 5 shaft 151 has secured thereto between the feeder side frames a pair of arms 152, the ends of which are loosely connected to studs 153 which are in a line parallel with shaft 151 and are provided at their ends with blocks 154 which are adapted to slide in vertical guides 155 formed on the side frames. Swung on studs 153 are two depending arms 156 and tying the lower ends of these arms together is a bar 157. Two section pad housings 158 are adjustably mounted on bar 157 for lateral adjustment, to adapt the lifters to sheets of different widths, and the bar 157 is vertically adjustable on the arms 156 to provide for different sizes of suction pads. The stems 159 (Fig. 7) of the suction pads are slidably mounted in each housing 158 and are held yieldingly down by a coil spring 159ᵃ in the housing engaging at its lower end a collar on the quill and at its upper end the wall of the housing chamber. The quill is threaded and provided with a check nut 161 and communicates with a hose 162 which is connected to a pipe 163 leading to the suction chamber of a pump 164. The cylinder of pump 164 (Fig. 1) is pivoted at 165 to a bracket 166 secured to press frame 10 and the piston rod of the pump is pivoted to one arm of a bell crank 167 the other arm of which has an adjustable connection with a link 168 connected to and driven by an arm on the press rocker shaft 17. The mechanism described is adapted to reciprocate the suction pads up and down in a vertical plane in proper timed relation to the movement of the feeder grippers, the sheet feeding mechanism, however, further embodies devices for giving the suction pads in addition to their vertical lifting movements a movement towards and from the gripper fingers so that the sheets will not only be lifted but will be positively inserted into the throats of the gripper fingers. These devices include a cam 169 (Fig. 4) fast on shaft 26 inside and adjacent the cam 147, a pitman 170 (Fig. 1) reciprocated by cam 169, a lever 171 pivoted on a pin 171ᵃ secured to side frame 22 and having one arm connected to pitman 170, an upwardly and rearwardly extending rod 172 pivoted at its lower end to the other arm of lever 170, an arm 173 pivoted to the upper end of rod 172, a shaft 174 journaled in the feeder side frames and fast to arm 173, and a pair of arms 175 rigid with shaft 174 and having pins at their outer ends engaging slots 176 formed in the sides of arms 156. The cams 147 and 169 are so formed that the cam 147 will cause the suction pads to be moved up carrying a sheet and then to dwell throughout the rotation of cam 147 through an angle of about 270° (see Fig. 1). During this dwell in the vertical movement of the suction pads, the swinging cam 169 causes the suction pads to move over towards the grippers and insert the sheet into the throats of the grippers and then to move back, after which the cam 147 causes the pads to move down for another sheet.

For separating the top sheet, there is provided a horizontal pipe 177 (Figs. 3 and 5) which extends across the front of the sheet pile at the top thereof and is supported at one end by cam guide 48 and its other end by a bracket depending from cam 70 on the other cam guide 48 (see Fig. 5). This pipe is connected to a pipe 178 leading to the exhaust of pump 164 and is provided with a number of apertures opposite the top sheets, through which horizontal air blasts are directed against the edges of the top sheets, separating these sheets and preventing adherence of the top sheet to the next one.

Pile elevating mechanism.

The table 28 is adapted to be automatically raised by devices controlled by the level of the top sheet of the pile of the sheets thereon. Referring particularly to Figs. 2, 5 and 7, secured to the rear faces of the side frames 21, 22 near the top thereof is a pair of brackets 179 in the rear ends of which is journaled a trip shaft 180. On shaft 180 inside the feeder side frames and adjacent one of the suction pads is fixed a trip arm 181. This arm is formed with a split collar adapted to be clamped on the shaft so that the trip arm may be fixed in any desired lateral position in accordance with the widths of the sheets being operated on. The adjacent suction pad has fixed thereto a laterally projecting pin 182 which is adapted to contact arm 181 and rotate shaft 180 to trip the table lifting mechanism when the level of the sheet pile sinks below a predetermined elevation. On shaft 180 outside the bracket 179 is fixed an arm 182 which carries a roller 182$^a$ adapted to engage the upper arm of a pawl lever 183 fulcrumed on a depending part of bracket 179. The lower end of lever 183 has a tooth engaging a notch in a block 184 secured to the upper end of a rod 185, a spring 186 tending to hold the tooth engaged with the notch. Rod 185 is slidably mounted in the lower end of bracket 179 and in the projecting arm of a lower bracket 185$^a$. A coil spring 187 surrounds rod 185 between bracket 179 and a collar 188 secured to the rod, and operates to move the rod down when pawl lever 183 is released from engagement with block 184. The lower end of rod 185 has a pin and slot connection with an arm formed with and projecting radially from a disk mask 189 which is rotatable on a stud 190 journaled at one end to the feeder side frame 21 and at the other end in a bracket 191 bolted to said frame. Fixed on stud 190 is a ratchet wheel 192 and a toothed gear 193 and an adjustable disk mask 194 is located between the ratchet wheel and mask 189 and is rotatable on the stud. The ratchet wheel is adapted to be rotated by a pawl on an arm 195 pivoted on stud 190 and having rigid therewith on the opposite side of the stud from the pawl an abutment 196 adapted to engage a pin 197 projecting from the face of mask 189. The pawl arm 195 is pivoted to one end of a rod 198, the other end of which is connected to one arm of a bell crank 199 journaled in the feeder side frame 21. The other arm of this bell crank is connected by a rod 200 to a strap surrounding an eccentric 200$^a$ formed on the side of gear 95. Since the shaft 26 carrying gear 95 is continuously rotated during the operation of the press, once for each printing cycle, the pawl arm 195 will be continuously oscillated, once for each printing cycle. When the mechanism is in its non-tripped condition, however, as represented in Figs. 2 and 6, the oscillation of the pawl lever will be ineffective since the mask 189 covers all the ratchet teeth swept over by the pawl in its oscillation. Meshing with the gear 193 is a pinion 201 (Fig. 5) secured to the end of a shaft 202 journaled in the feeder side frames. Shaft 202 has fixed thereon a pair of bevel wheels 203 which mesh with bevel wheels 204 secured to the lower ends of screw shafts 205, the left hand one of which is rotatably supported in the brackets 179 and 185$^a$, previously referred to, and the other of which is rotatably supported to the other bracket 179 and in a similar lower bracket 206. The table 28 is guided for vertical movement on the feeder side frames by means of yokes 207 secured to the forward corners of the table embracing and engaging vertical flanges 208 on the sides frames, and the table is adapted to be operated by half nuts 209 engaging the threads of shafts 205. Half nuts 209 are formed with or otherwise attached to arms 210 which extend under the table and are connected at their rear ends to eccentrics formed on a shaft 211 which is journaled in bearings depending from the bottom of the table. The forward ends of the arms are supported by the heads of bolts 212 secured to the bottom of the table and projecting through slots formed near the forward ends of arms 210. Fixed centrally on the shaft 211 is a handle 213 whereby the shaft may be manually rotated to throw the half nuts into and out of engagement with the screw rods. Normally the handle occupies the position shown in Fig. 6, with the half nuts engaging the screw rods, and is held yieldingly in this position by a shouldered spring arm 214. When the handle is moved to the opposite position it is yieldingly held by a similar shouldered spring 215. In the latter position, the half nuts are out of engagement with the screw rods and the table may be quickly placed by the operator at any desired elevation.

The automatic table lifting devices operate in substantially the following manner: When the level of the sheet pile sinks below a predetermined level the pin 182 on the suction pad will depress the arm 181 causing rotation of trip shaft 180 and withdrawal of pawl 183 from the notch in block 184. The spring 187 will then instantly move rod 185 down and rotate mask 189 in a clockwise direction, looking at Fig. 6, the pawl lever 195 at this time being near the opposite limit of the position shown in this figure, so that abutment 196 is away from the pin 197 on the mask. The rotation of the mask in a clockwise direction uncovers a predetermined number of ratchet teeth by reason of its cut away portion and hence on the return movement of the pawl arm the pawl will engage the last tooth uncovered by said mask in its clockwise rotation and rotate the ratchet through an angle determined by the number of teeth uncovered by the mask, thus rotating the screw shafts 205 and raising the table. In this return, or driving, movement of the pawl arm the abutment 196 will engage the pin 197 and so return the mask and rod 185 to their cocked position, in which they are held against the tension of spring 187 by engagement of pawl 183 with the notch in block 184. A second, or adjusting mask 194 has a cut away portion located relatively to the cut away portion of mask 189 as indicated in Fig. 6. The position of the cut away portion of mask 194 may be varied by simply rotating the mask by hand, a finger-hold pin 216 being provided for this purpose. The periphery of the mask 194 is provided with teeth adapted to engage a spring pawl 217, whereby the mask may be held in a number of adjusted positions. When mask 194 is moved counter-clockwise, looking at Fig. 6, it will shroud a number of ratchet teeth which would otherwise be uncovered by mask 189 and so cause the table to be elevated a lesser amount per actuation of the tripping devices, and conversely, when mask 194 is rotated clockwise it will unshroud a number of ratchet teeth permitting the last one unshrouded to be engaged by the pawl when mask 189 is tripped, thus causing rotation of the ratchet through a larger angle and hence a greater elevation of the table per actuation. Thus the automatic intermittent elevation of the table may be adjusted so that the degree of elevation per actuation may be varied to suit any thickness of the sheets.

*Pile guides.*

The pile of sheets on the table is guided by devices which comprise front guides 218 (Fig. 3), side guides 219 (Fig. 1) and back guides 220 (Figs. 1 and 5). The front guides 218 consist of a pair of steel strips which are fixed at their lower ends on split collars 221 (Figs. 3 and 5) on a tie rod 222 secured to the brackets 185ª and 206. The front guides extend up along the front edges of the sheets to points above the pile. The side guides 219 consist of a pair of rods slidably mounted in holders 223 which are formed with split collars supported on a tie rod 224 which is secured at its ends in the brackets 179. The split collars are adapted to be clamped on shaft 224 in any position required by the width of the sheets. The rods 219 being freely slidable in their holders will move vertically when the table comes into engagement with their lower ends and so permit elevation of the table while still guiding the sheets thereon throughout the range of the pile on the table. The back guides 220 are supported by rods 225 which extend over the sheet pile and are mounted at their forward ends in sleeves 226 formed with split collars 227 which surround the tie rod 224, said collars being adapted to be clamped in any desired adjusted position on the shaft. The back guides 220 are slidably mounted in holders 228 which are formed with split collars adapted to be clamped on rods 225 in any desired position of adjustment.

Figure 17:
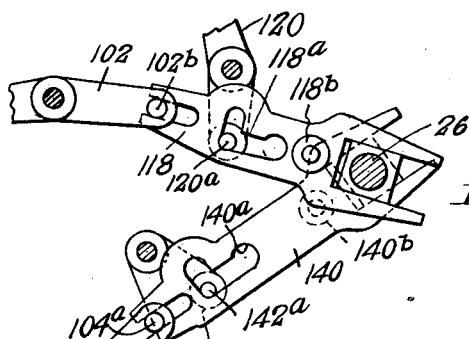
Fig. 17 is a detailed view of the pitmen for operating the impression throwoff and rendering the delivery inoperative, together with portions of the levers cooperating with the pitmen.

Referring particularly to Fig. 17, the delivery table 29 is operated by vertical screw shafts 230 which are rotatably supported at their upper and lower ends in brackets 231 and 232 bolted to the feeder side frames. The table is guided on said rods by sleeves 233 which are formed with or otherwise attached to the table centrally at the sides thereof, and is operated by the screw shafts by means of half nuts 234 rigid with the outer ends of two links 235 slidably mounted beneath the table. The links 235 are provided with slots near their outer ends through which project headed bolts 236 screwed into the bottom of the table and the links are connected at their inner ends to eccentrics rigid with a manually operable shaft 237. Thus the nuts may be disengaged from the screw shafts to permit quick lowering or adjustment of the table in substantially the same way as in the case of the feed table. The screw shafts carry at their lower ends miter gears 238 which mesh with similar gears 239 on a shaft 240 which is journaled in the side frames and which carries at its end outside the left hand frame 21 a spur gear 241. Gear 241 meshes with a larger gear 242 (Fig. 2) on a stud shaft 243 journaled in the side frame and in a bracket 244 bolted to said frame. A ratchet wheel 245 (Fig. 2) with gear 242 is intermittently rotated by means of a pawl lever 246 pivoted on shaft 243 and connected at its outer end with a link 247 which is pivoted to an arm 248 keyed on the projecting end of shaft 31. Shaft 31 carries the feeder arms 30 and is constantly rocked during the operating of the press, as heretofore described. The delivery table therefore will be intermittently lowered, one step for each printing cycle. For adjusting the lowering steps in accordance with the thickness of the sheets, there is provided a mask 249 having a cut away portion. This mask is rotatably mounted against the outer face of the ratchet 245 and is adapted to be held in adjusted positions by a spring pawl, 249ª supported on bracket 244 and adapted to engage teeth in the periphery of the mask.

Front guides for the sheets on the delivery table are provided by a pair of steel strips 250 (Figs. 3 and 17) secured at their lower ends to a rod 251 which is attached to brackets 252 bolted to the feeder side frames.

Having thus described the invention what is claimed as new and desired to be secured by U. S. Letters Patent is:

1. Sheet feeding and delivery mechanism for platen printing presses comprising in combination means for feeding sheets to the press, means for taking printed sheets therefrom, and means for rendering said last named means inoperative upon failure to feed a sheet.

2. Sheet feeding and delivery mechanism for printing presses having an oscillating platen, comprising in combination means for feeding sheets to the platen, means for taking printed sheets from the platen and means for rendering said last named means inoperative upon failure to feed a sheet.

3. Sheet feeding and delivery mechanism for platen printing presses comprising in combination means for feeding sheets to the platen, a set of delivery grippers mounted to reciprocate towards and from the platen, and means operative upon failure to feed a sheet to change the path of reciprocation of said grippers to render them inoperative with respect to the platen.

4. Sheet feeding and delivery mechanism for platen presses comprising in combination means for feeding sheets to the platen, a movable cam guide, a carriage reciprocable in said guide towards and from the platen, and means operative upon failure to feed a sheet to move said guide upwardly and prevent coaction of the grippers with the platen.

5. Sheet feeding and delivery mechanism for platen presses, comprising in combination means for feeding sheets to the platen, cam guides supported in vertical planes at the sides of the platen, carriages movable in said cam guides, gripper supports connecting said carriages, grippers on said supports, and means operative upon failure to feed a sheet to raise said guides.

6. Sheet feeding and delivery mechanism for platen presses comprising in combination means for feeding sheets to the platen, cam guides located in vertical planes at the sides of the platen and supported on horizontal pivots near their rear ends, carriages reciprocable in said cam guides, supports, rods supporting the forward ends of said carriages, and means operative upon failure to feed a sheet to raise said rods.

7. Sheet feeding and delivery mechanism for platen presses comprising in combination means for feeding sheets to the platen, cam guides located in planes at the sides of the platen and horizontally pivoted near their rear ends, carriages reciprocable in said guides, supports connecting said carriages, grippers on said supports, a rotatable shaft below said guides, eccentrics on said shafts, rods pivoted at their upper ends to said guides and having straps at their lower ends surrounding said eccentrics, said eccentrics being normally on dead center with respect to said rods, and means operative upon failure to feed a sheet to rotate said shaft and move said grippers up out of operative relation to the platen.

8. Sheet feeding and delivery mechanism for platen presses comprising in combination means for feeding sheets to the platen, cam guides located in vertical planes at the sides of the platen and horizontally pivoted near their rear ends, carriages reciprocable in said guides, supports connecting said carriages, grippers on said supports, a rotatable shaft below said guides, eccentrics on said shafts, rods pivoted at their upper ends to said guides and having straps at their lower ends surrounding said eccentrics, a shaft operably connected to the drive shaft of the press so as to make one revolution per cycle of the press, a cam on said shaft, a pitman operable in one direction by said cam, a spring operating said pitman in the other direction, a latch normally preventing operation of said pitman in said other direction, a magnet operable to release said latch upon failure to feed a sheet, and means controlled by said pitman when released to rotate said eccentric shaft.

9. Sheet feeding and delivery mechanism for presses of the oscillating platen type, comprising in combination means for feeding sheets to the platen, cam guides located in vertical planes at the sides of the platen and horizontally pivoted near their rear ends, carriages reciprocable in said guides, supports connecting said carriages, grippers on said supports, an eccentric shaft below said grippers, eccentrics on said shafts, rods pivoted at their upper ends to said guides and having straps at their lower ends surrounding said eccentrics, a shaft making one revolution per cycle of the press, a cam on said shaft, a pitman operable in one direction by said cam, a spring operating said pitman in the other direction, a latch normally preventing operating of the pitman in said other direction, a magnet operable to release said latch upon failure to feed a sheet, a second pitman constantly reciprocated by said last mentioned shaft, a normally inoperative connection between said second pitman and said eccentric shaft, and means operating upon movement of said first pitman under the action of said spring to render said connection operative.

10. Sheet feeding and delivery mechanism for presses of the oscillating platen type, comprising in combination means for feeding sheets to the platen, cam guides located in vertical planes at the sides of the platen and horizontally pivoted near their near ends, carriages reciprocating on said guides, supports connecting said carriages, grippers on said supports, rods supporting the forward ends of said guides, a shaft below said grippers, eccentrics on said shaft, rods pivoted at their upper ends to said guides and having straps at their lower ends surrounding said eccentrics, an arm on said shaft, a lever, a link connecting said arm and lever, and means to move said lever upon failure to feed a sheet.

11. In combination with a printing press having an oscillating platen, means for taking printed sheets from the platen comprising cam guides located in vertical planes at the sides of the platen, housings having rollers operating in said cam guides, blocks slidably mounted in said housings a rod tying said blocks together, a hollow shaft having its ends rotatable in said blocks, a shaft in said hollow shaft projecting from the ends thereof and having toothed wheels on its projecting ends, racks in said housings meshing with said wheels, said housings being formed with longitudinal slots and said blocks having clamping bolts projecting through said slots, lower gripper fingers mounted on said rod, upper gripper fingers on said hollow shaft, and means for reciprocating said housings and cocking and uncocking said gripper fingers in timed relation to the operation of the press.

12. In combination with a platen printing press, means for taking printed sheets from the platen comprising cam guides located at the sides of the platen and extending forwardly thereof, housings operating in said cam guides, blocks slidably mounted in said housings, clamping means for holding said blocks at desired positions of adjustment in said housings, a rod tying said blocks together, a hollow shaft having its ends rotatable in said blocks, a shaft in said hollow shaft projecting from the ends thereof and having toothed wheels on its projecting ends, racks in said housings meshing with said wheels, lower gripper fingers mounted on said rod, upper gripper fingers on said hollow shaft, and means for reciprocating said housings and cocking and uncocking said grippers in timed relation to the operation of the press.

13. In combination with a platen printing press, means for taking printed sheets from the platen comprising guides located in vertical planes at the sides of the platen, housings operable in said guides, blocks slidable in said housings, a rod tying said blocks together, a rotatable shaft parallel with said rod, upper and lower grippers on said shaft and rod respectively, a shaft extending between said blocks, toothed gears on the ends of said last mentioned shaft, racks in said housings engaging said gears, and means for reciprocating said housings and cocking and uncocking said grippers in timed relation to the operation of the press.

14. In combination with a platen printing press, means for taking printed sheets from the platen comprising guides located at the sides of the platen, housings operable in said guides, blocks slidable in said housings, transverse supports connected to said blocks, upper and lower grippers on said supports, means for adjusting and clamping said blocks in said housings, and means for reciprocating said housings and cocking and uncocking said grippers in timed relation to the operation of the press.

15. In combination with a platen printing press, means for taking printed sheets from the platen comprising guides located at the sides of the platen, housings operable in said guides, transverse supports connected to said housings, upper and lower grippers on said supports, means for adjusting and clamping said supports to the housings, said means effecting exactly equal movements of the supports in the housings, and means for reciprocating said housings and cocking and uncocking said grippers in timed relation to the operation of the press.

16. In combination with a printing press having an oscillating platen and an eccentric shaft rotatable in the rocker of the platen and controlling the impression, means to feed sheets to the platen, an arm rigid with said eccentric shaft, a latch normally locking said eccentric shaft in impression on position, a pivoted arm, normally broken toggle connected to said pivoted arm, and means operating on failure to feed a sheet to straighten said toggle and move said pivoted arm, said pivoted arm when thus moved engaging and releasing said latch and having a surface adapted to cam the eccentric shaft arm during the initial closing movement of the platen to throw the impression off.

17. In combination with a printing press having an oscillating platen and an eccentric shaft rotatable in the rocker of the platen and controlling the impression, means to feed sheets to the platen, an arm rigid with said eccentric shaft, a movable member, a normally broken toggle connected to said member, and means operating on failure to feed a sheet to straighten said toggle and move said member, said member engaging said arm when thus moved and camming it during the initial closing movement of the platen to throw the impression off.

18. In combination with a printing press having an oscillating platen and an eccentric shaft rotatable in the rocker of the platen and controlling the impression, means to feed sheets to the platen, an arm rigid with said eccentric shaft, a movable member, and means operating on failure to feed a sheet to move said member, said member engaging said arm when thus moved and causing it, during the initial closing movement of the platen, to throw the impression off.

19. In combination with a printing press having an oscillating platen and an eccentric shaft rotatable in the rocker of the platen and controlling the impression, means to feed sheets to the platen, a pair of arms rigid with said eccentric shaft, a segment on the rocker concentric with said shaft, a latch pivoted to one of said arms normally engaging an end of said sector to lock the platen in impression on position, a pivoted arm having a shoulder adapted to engage the other of said arms when the platen is open, means for moving said pivoted arm when the platen is open upon failure to feed a sheet, said pivoted arm when thus moved raising said latch from engagement with said sector and having a cam surface adapted to engage said other arm and cause rotation of said eccentric shaft to impression off position when the platen moves towards closed positions, and a second latch pivoted to said other arm and adapted to engage the other end of said segment to lock the impression off, said pivoted arm having an abutment adapted to engage said second latch when the platen again approaches open position.

20. In combination with a printing press having an oscillating platen and an eccentric shaft rotatable in the rocker thereof and controlling the impression, means to feed sheets to the platen, an arm rigid with said eccentric shaft, a latch normally locking said eccentric shaft in impression on position, a second latch adapted to lock said shaft in impression off position, a movable member, means operating upon failure to feed a sheet to move said member, said member when thus moved engaging said first latch and releasing said shaft and said member having a surface engaging said arm and causing rotation of said shaft to impression off position during the initial closing movement of the platen, said member having abutment surfaces adapted to engage and release said second latch when the platen again approaches open position and then to engage said arm to rotate and lock said shaft in impression on position.

21. In combination with a printing press having an oscillating platen and an eccentric shaft controlling the impression, means to feed sheets to the platen, an arm rigid with the eccentric shaft, and a trip controlled by said means adapted to engage said arm and trip the platen to impression off position upon failure to feed a sheet thereto.

22. In combination with a printing press having an oscillating platen, means to feed sheets to the platen, a shaft making one revolution per cycle of the press, a cam on said shaft, a pitman operable in one direction by said cam, a spring operating said pitman in the other direction, a latch normally preventing operation of said pitman in said other direction, a magnet operable to release said latch upon failure to feed a sheet, a second pitman constantly reciprocated by said shaft, a longitudinal slot formed with a right angularly extending portion, a lever having a pin on one arm engaging said slot, a connection between said pitman operating when the first pitman is released to engage the pin with the right angularly extending portion of said slot, a second lever, a link connecting the other arm of said first mentioned lever with said second lever and forming with said other arm a normally broken toggle, and a trip arm rigid with said second lever adapted to trip the platen to impression off position.

23. In combination with a printing press having an oscillating platen and an eccentric shaft controlling the impression, means to feed sheets to the platen, an arm rigid with said eccentric shaft, a latch normally locking said shaft in impression on position, a second latch adapted to lock said shaft in impression off position, a pivoted arm adapted to release said first latch and having a surface adapted to engage said arm and cause rotation of said shaft to impression off position during the initial closing movement of the platen said arm having abutment surfaces adapted to engage and release said second latch when the platen approaches open position and thereafter to engage said arm and rotate and lock said shaft in impression on position, an arm rigid with said second mentioned arm, a lever, a link connecting said lever with the last mentioned arm, said link and lever forming a normally broken toggle, and means operating upon failure to feed a sheet to straighten said toggle and thereby move said second mentioned arm into a position to trip said eccentric shaft to impression off position.

24. In combination with a printing press having an oscillating platen and an eccentric shaft controlling the impression, means to feed sheets to the platen, and means to rotate and lock said eccentric shaft in impression off position upon failure to feed a sheet.

25. In combination with a printing press having an oscillating platen, means to feed sheets to the platen, means to lock the platen in impression on position, and means operating on failure to feed a sheet to unlock the platen, throw it to impression off position and lock it in this position.

26. In combination with a printing press having an oscillating platen, means to feed sheets to the platen means to lock the platen in impression on position, and means operating upon failure to feed a sheet to the platen to unlock the platen and during the initial closing movement thereof to throw it to impression off position and lock it in this position, said means operating when the platen approaches open position to unlock the platen, throw it to impression on position and lock it in this position.

27. In sheet feeding mechanism for platen presses, in combination a frame secured to the front of the press, a feed table mounted on said frame adapted to hold a pile of sheets, grippers mounted to oscillate from the platen to a point adjacent the top of the sheet pile, means effecting one complete oscillation of the grippers per cycle of the press, means for cocking and uncocking said grippers as they approach the limits of their movements towards the sheet pile and platen, respectively, a transverse shaft mounted in said frame above the sheet pile, arms on said shaft, links pivoted to the free ends of said arms having vertical slots at their lower ends, a bar tying said links together, suction pad housings secured to said bar, suction pads mounted in said housings, a second transverse shaft mounted in said frame, arms on said second shaft having pins on their free ends engaging said slots, and means effecting one complete oscillation of said shafts per cycle of the press, to cause said suction pads to lift sheets singly from the pile and move them into the throats of said grippers.

28. In sheet feeding mechanism, in combination a feed table adapted to hold a pile of sheets, grippers oscillating towards and from the pile, means for cocking and uncocking said grippers as they approach the limits of their movement away from and towards the sheet pile respectively, suction pads mounted above said pile to swing in parallel vertical planes and to reciprocate up and down in said planes, and means for reciprocating said pads and swinging them towards and from the grippers, said means operating in timed relation to the operation of the grippers so as to lift sheets singly from the pile and insert the edges thereof into the throats of the grippers just before the latter are uncocked.

29. In sheet feeding mechanism for platen presses, in combination a frame comprising side members secured to the front of the press frame and extending forwardly therefrom and then upwardly, a feed table slidably mounted on the upwardly extending portions of said members, adapted to hold a pile of sheets, a transverse shaft journaled in the side members of said frame and geared to the crank shaft of the presses as to make one revolution per cycle of the press suction pads mounted in the upper part of the frame over the feed table to swing in vertical longitudinal planes and to reciprocate up and down in said planes, cams on said shaft and connections operated thereby for reciprocating and swinging said pads, a bracket secured to the forward part of the press frame, a pump supported on said bracket, a horizontal pipe supported near the front edges of the top sheets and having a number of apertures opening opposite the top sheets, conduits connecting said pipe and suction pads with the exhaust and suction chambers of said pump.

30. In sheet feeding mechanism for platen presses, in combination a bracket secured to the forward part of the press frame, a reciprocating pump supported in said bracket, a feeder frame secured to the press frame, a bell crank pivoted to said feeder frame and having one arm connected to the piston rod of said pump, a link connecting the other arm of said bell crank to the press rocker shaft, and pneumatic feeding devices connected to said pump.

31. In sheet feeding mechanism for platen presses, in combination a feeder frame secured to the forward part of the press frame, a bracket secured to the press frame beneath said feeder frame, a reciprocating pump having its cylinder pivoted at the bottom to said bracket, a bell crank pivoted in said feeder frame having one arm connected to the piston rod of the pump, a link adjustably connected at one end to the other arm of the bell crank and pivoted at its other end to the rocker of the press, and pneumatic sheet feeding means connected to said pump.

32. In sheet feeding mechanism for printing presses having an oscillating platen and a crank shaft operating said platen, in combination a feeder frame secured to the front of the press frame, a feeder table mounted for vertical movement in said feeder frame, grippers oscillating between the table and platen, means driven from said crank shaft for oscillating said grippers, a transverse shaft journaled in said feeder frame and geared to said crank shaft so as to make one revolution per revolution of said crank shaft, means to take sheets singly from the pile supported on said table and insert them into the throats of the grippers, and cams on said transverse shaft operating said means.

In testimony whereof we hereunto affix our signatures.

WALTER O. HALL.
WILLIAM C. BUCHANAN.